United States Patent [19]
Freake et al.

[11] 3,888,741
[45] June 10, 1975

[54] CULTURING MEANS AND TEST KIT

[75] Inventors: Ronald Freake; Mau H. Kuo, both of Elkhart; Devendra Vaikunthlal Mehta, South Bend, all of Ind.

[73] Assignee: Miles Laboratories, Inc., Elkhart, Ind.

[22] Filed: Apr. 25, 1974

[21] Appl. No.: 464,107

[52] U.S. Cl............ 195/139; 195/103.5 R; 195/142
[51] Int. Cl.............................................. C12k 1/10
[58] Field of Search.................. 195/103.5, 139, 142

[56] References Cited
UNITED STATES PATENTS

| | | | |
|---|---|---|---|
| 3,165,450 | 1/1965 | Scheidt | 195/139 |
| 3,248,302 | 4/1966 | Mackin | 195/139 |
| 3,451,894 | 6/1969 | Anandam | 195/139 |

Primary Examiner—A. Louis Monacell
Assistant Examiner—Robert J. Warden
Attorney, Agent, or Firm—Andrew L. Klawitter

[57] ABSTRACT

Means for culturing microorganisms in an environment enriched with a particular gas is disclosed. The culturing means comprises a microbiological nutrient means capable of supporting microbiological growth and a composition for producing controlled release of the particular gas. A test kit for presumptive identification of microorganisms is also provided comprising the above described culturing means and an indicator for the microorganism being detected. Such culturing means and test kit are particularly useful in culturing and identifying *Neisseria gonorrhoeae*.

34 Claims, 4 Drawing Figures

CULTURING MEANS AND TEST KIT

BACKGROUND OF THE INVENTION

1. Field of the Invention

This invention relates to culturing means for supporting microbiological growth in an environment enriched with a gas, particularly carbon dioxide. The present invention therefore finds particular application in the isolation and identification of *Neisseria gonorrhoeae*.

In the diagnosis of microbial derived diseased conditions in man and animals, it is often highly useful to determine the particular causative microorganisms. This is particularly true in the diagnosis of the venereal disease gonorrhea which is the direct result of infection with the microorganism *Neisseria gonorrhoeae*. Many methods have evolved from the search for specific microbial identification tests, including the use of colorimetric indicators and immunochemical indicators. Nonetheless, the conventional diagnosis of certain microbial derived diseases remains based on microbiological culture techniques.

2. Description of the Prior Art

Conventional microbiological techniques used in diagnosis of microbial derived diseases involve an in vitro culturing of a test sample obtained from the subject under diagnosis. The culturing media used may be either capable of supporting the growth of a broad spectrum of microorganisms or selective to a small number of microorganisms or even a single strain of microorganism. Generally the object of using an all-purpose medium is to isolate pure colonies from the sample and thereafter to analyze them either chemically or biologically in order to identify pathological microorganisms in the sample. When a selective media is used one knows if a certain group or variety of microorganisms is present or absent in the sample based on a growth or no-growth observation. It is therefore critical to such microbiological techniques to have available appropriate culturing techniques for those microorganisms of pathological significance.

In several instances, the environment of the growing culture is critical to the initial isolation and viability of the growing microorganisms. The carbon dioxide content of the culture environment is often critical, as in the case of *Neisseria gonorrhoeae*.

Conventional culturing techniques involving the production and maintenance of gas enriched atmospheres possess many disadvantageous characteristics, particularly in clinical applications. The classical method of maintaining a culture in a carbon dioxide enriched atmosphere is to incubate the culture in a candle jar. An alternative is to use incubators equipped with carbon dioxide generating apparatus. For example, the standard culturing techniques adopted by the Department of Health, Education, and Welfare for the diagnosis of gonorrhea involve either the use of a candle jar in conjunction with Thayer-Martin media plates or Transgrow slants in bottles filled with carbon dioxide. Candle jars are awkward to use; carbon dioxide incubators restrict testing to laboratories possessing such equipment; and Transgrow bottles require careful manipulation to prevent the loss of carbon dioxide.

It is therefore an object of the present invention to provide a convenient means for culturing microorganisms in a gas enriched atmosphere.

It is another object of the present invention to provide a convenient test kit for the presumptive identification of microorganisms particularly suited for the detection of *Neisseria gonorrhoeae*.

SUMMARY OF THE INVENTION

It has now been found that a convenient, highly useful means for culturing a microorganism in an environment enriched with a gas is provided through the combination of a microbiological nutrient means, a composition for producing controlled release of the particular gas, and means providing an enclosure for said nutrient means and the gas generating composition.

The gas generating composition of the present invention comprises at least two solid reactants which in the presence of water react to produce the desired gas. The composition also includes means for controlling the rate of said reaction and thereby the rate of release of gas, said means preferably comprising a water soluble polymeric substance and a water insoluble polymeric substance. Upon exposing the composition to water either in its liquid or gaseous state, the composition is activated and releases the desired gas at a controlled rate. In the case of the preferred gas generating composition the rate of gas release is a function of the proportion of water soluble polymeric substance to water insoluble polymeric substance. The composition may be in the form of a solid matrix such as a block or film, or may be incorporated with a carrier member.

The present invention is particularly useful in culturing those microorganisms, particularly *Neisseria gonorrhoeae*, which require a carbon dioxide enriched environment. The combination of the present culturing means with indicator means selectively indicative of a particular variety of microorganism provides a test kit for the presumptive identification of such microorganism in a test sample. Such a kit is provided for detecting *Neisseria gonorrhoeae* through the use of a cytochrome oxidase indicator.

DESCRIPTION OF THE PREFERRED EMBODIMENTS

Figure 1:
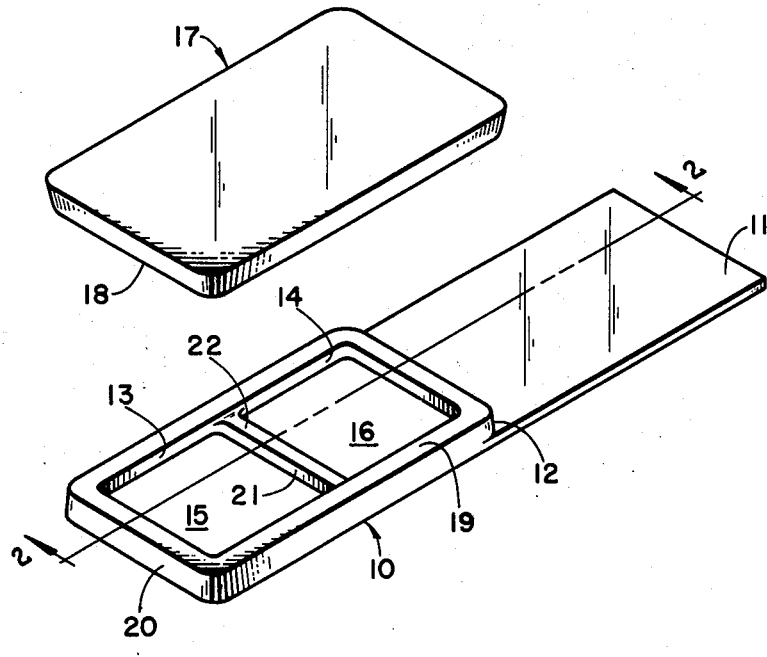
FIG. 1 is an exploded perspective view of a preferred form of culturing means constructed in accordance with the present invention.
Figure 2:
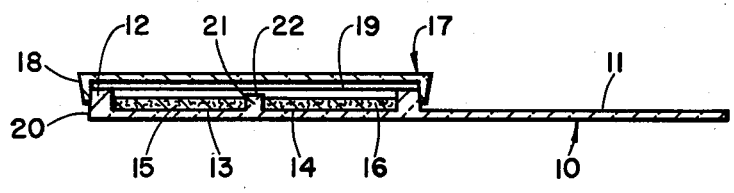
FIG. 2 is a longitudinal cross-sectional view of the culturing means depicted in FIG. 1 in its unexploded form, such view being taken along line 2—2 of FIG. 1.

Referring to the drawings, FIGS. 1 and 2 show a culturing means comprising a rectangular base or receptacle member 10 and a cooperable rectangular cover member 17. Base member 10 has an elongated rectangular plate-like bottom wall 11 having formed on one end portion thereof an upstanding annular rectangular wall 12. The wall 12 has a planar upper surface generally parallel with the bottom wall 11 and has an outer generally vertical surface 20 which tapers inwardly from bottom to top as shown in the drawings. Base member 11 is also formed with an upstanding transverse wall 21 having an upper surface 22 spaced below the upper surface 19 of wall 12 and generally parallel therewith. Walls 12 and 21 define spaced rectangular wells 13 and 14. Nutrient means in the form of a nutrient gel layer or dry nutrient pad 15 and gas generating means in the form of a pad or film 16 are disposed in wells 13 and 14, respectively. Cover member 17 has a rectangular annular depending flexible lip portion 18 which is telescopically engagable with the upper portion of the outer surface 20 of wall 12 in a manner to provide secure engagement therewith while allowing seepage of gas under positive pressure. With cover 17 in place the space between the upper surfaces 19 and 22 of walls 12 and 21, respectively, insures gaseous communication between wells 13 and 14. When a dry nutrient pad used as the nutrient means 15, it is rehydrated and inoculated with a sample to be cultured. Cover member 17 is then engaged with the outer surface 20 of wall 12 and the assembled device placed in an appropriate incubation environment.

Base member 10 and cover 17 may be made out of any suitable material, organoplastics being preferred. For example, base member 10 may be made from a relatively rigid organoplastic such as polystyrene and cover 17 may be made of a relatively more flexible organoplastic such as polyethylene. It will be observed that when the cover 17 is in place on base member 10, said cover and base member cooperate to provide an enclosure for nutrient pad 15 and gas generating pad 16.

Figure 3:
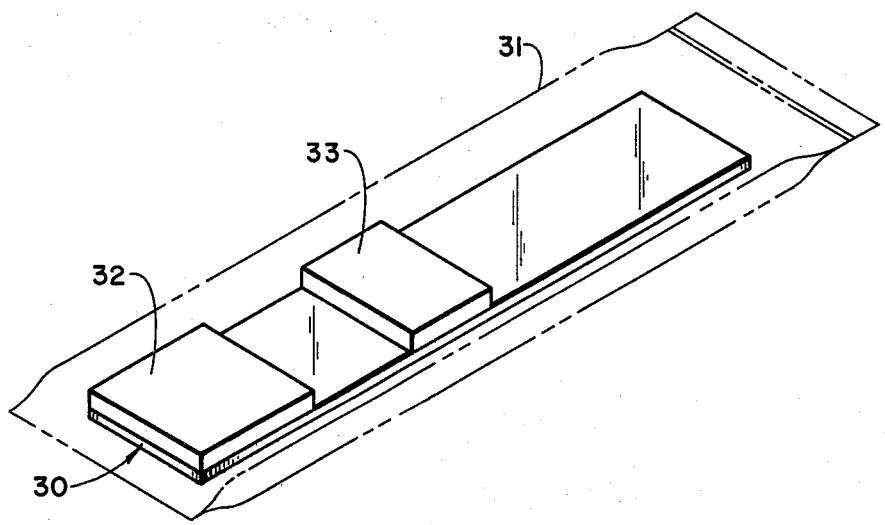
FIG. 3 is a perspective view of an alternative form of culturing means constructed in accordance with the present invention.

Another form of the invention is shown in FIG. 3 wherein a rectangular base member 30 has attached thereto a nutrient pad 32 and a gas generating pad or film 33. Means is provided for enclosing at least the nutrient pad 32 and gas generating pad or film 33, such closure means preferably comprising a sealable plastic bag or a moisture-proof envelope 31 into which base member 30 may be placed. Enclosure 31 is shown in dot and dash lines in FIG. 3. In use, nutrient pad 32 is rehydrated and inoculated with a sample to be cultured. Base member 30 is then placed in envelope 31 which is then sealed and placed in an appropriate incubation environment.

Figure 4:
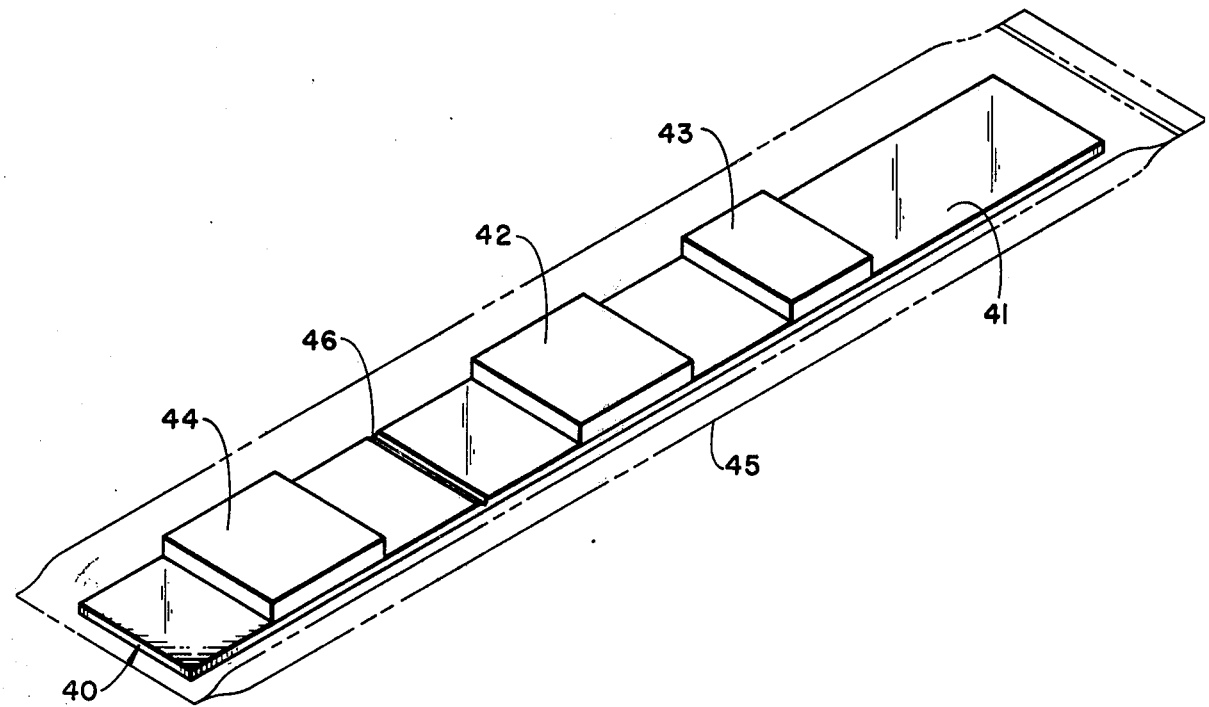
FIG. 4 is a perspective view of a test kit constructed in accordance with the present invention.

FIG. 4 shows a test kit comprising a test device 30 having a base member 41 to which are attached a nutrient pad 42, a gas generating pad 43, and an indicator pad 44. Indicator pad 44 comprises a bibulous carrier member impregnated with a reagent selectively indicative of a particular variety of microorganisms. Base member 41 is formed with a transversely extending area of reduced cross section 46 providing an integral flexible hinge permitting the end portion bearing pad 44 to be swung upwardly sufficient to bring the upper surface of pad 44 into contact with the upper surface of pad 42. Closure means 45 shown in dot and dash lines in FIG. 4 is capable of enclosing at least nutrient pad 42 and gas generating pad 43, such closure means preferably comprising a sealable plastic bag or moisture-proof envelope into which test device 40 may be placed. In use, nutrient pad 42 is rehydrated and inoculated with a sample to be cultured. Base member 40 is then placed in closure means 45 which is then sealed and placed in an appropriate incubation environment. After incubation, base member 40 is removed from the closure means and indicator pad 44 is brought into contact with nutrient pad 42 as described above.

Various changes and modifications may be made in the illustrated embodiments without deparing from the spirit of the invention. For example, the gas generating composition, instead of being attached to the base member as shown in the drawings, may be attached to the enclosing means, for example attached to the inner surface of the cover 17 in FIGS. 1 and 2 or to an inner surface of the sealable plastic bags 31 or 45 in FIGS. 3 and 4. Alternatively, the gas generating composition may be loose and unattached, so long as it is disposed within an enclosure along with the nutrient pad and is thereby in gaseous communication therewith.

The microbiological nutrient means contemplated by the present invention may comprise any conventional means for supporting the viability or growth of the microorganism or microorganisms to be cultured. Such nutrient means generally comprises a microorganism supporting matrix incorporated with a microbiological nutrient substance. The term nutrient substance includes those substances which actively participate in the metabolism of the microorganism to be cultured. Substances which support microbiological growth as well as those which retard such growth are nutrient substances for the purpose of this invention. Thus, the nutrient means may comprise an all-purpose general medium capable of supporting the growth of a wide range of microorganisms. On the other hand, a selective medium may be used comprising only those nutrients required by a particular group or variety of microorganisms and including, if desired, antimicrobial agents to retard the growth of undesired microorganisms. Particularly useful in devising a microbiological system for identifying *Neisseria gonorrhoeae* are adaptations of selective media generally known as Thayer-Martin media. Such an adaptation is disclosed in Example 1 to follow.

Exemplary of microbiological nutrient means which may be used in the present invention are gelatinous or colloidal matrices incorporated with nutrient medium, such as nutrient agar, and absorbent materials such as filter paper incorporated with a dry nutrient substance such as the dry residue of a previous impregnation with a liquid nutrient medium. The latter described nutrient pad is especially convenient to use as the nutrient substance in this form maintains a high degree of stability.

The culturing means of the present invention in combination with an indicator pad incorporated with a reagent reactable with a group or variety of microorganisms provides a convenient test means for presumptively identifying microorganisms in a sample. The indicator may react either with the microorganism or a structural component thereof, for example using a tetrazolium salt as the indicator, or may react with a metabolic product or other substance released by the microorganism. For instance, in testing for *Neisseria gonorrhoeae* it is known that such microorganism releases an extra-cellular oxidase enzyme specifically reactable with certain indicators conventionally known as cytochrome oxidase indicators. Exemplary of these indicators are p-amino dimethylaniline, dimethyl phenylenediamine, N,N,N',N'-tetramethyl-p-phenylenediamine dihydrochloride, dimethyl-p-phenylenediamine oxalate, and a mixture of dimethyl phenylenediamine and alpha-naphthol. While microorganisms other than *Neisseria gonorrhoeae* release enzymes reactable with these indicators, the test may be made highly selective for *Neisseria gonorrhoeae* by culturing the sample with a selective culture medium unable to support substantial growth of the interfering microorganisms.

It has been found that the indicator may be stabilized through the additional incorporation therewith of a water soluble polymer such as polyvinyl alcohol. The use of such a stabilizing polymer has been found to be particularly useful when a cytochrome oxidase indicator is used, since in solution this indicator is both heat and light labile. Cytochrome oxidase indicator pads which include a water soluble polymer have been found to be stable for several months at room temperature and exposed to room light.

An important feature of the present invention is the controlled release gas generating composition disclosed herein. The gas generating composition must be capable of maintaining a critical level of the released gas in the environment enclosing the nutrient means. The composition is activated by contact with water in its liquid or gaseous state, for instance by the moisture released from the nutrient means during incubation.

The combination of a water soluble polymeric substance, a water insoluble polymeric substance, and a water activated reagent system provides an especially useful and preferred composition capable of releasing a desired gas at a controlled rate dependent upon the relative proportions of the polymeric substances. A higher proportion of water soluble polymer generally increases the rate of gas evolution. The rate of gas evolution is also increased when the composition is exposed to greater concentrations or amounts of water or includes higher concentrations or amounts of reactants. For a given amount of reactants in the composition and a given amount of water in contact with the composition, the rate of gas evolution is a function of the proportion of water insoluble polymer to water soluble polymer. Preferably, between about 10 and 90 percent by weight of the total polymer present in the composition is comprised of either a water insoluble polymer or a water soluble polymer. The most desirable uniform gas release rates are found when the polymer content of the composition is between 1 and 3 parts by weight of insoluble polymer and between 1 and 3 parts by weight of soluble polymer. Particularly useful is the fact that the composition may be activated by contact with water in its gaseous state rather than requiring liquid water for activation. When applied to microbiological culturing systems this means that the moisture released by a nutrient agar layer or a rehydrated nutrient pad is sufficient to initiate gas evolution.

Polymeric substances useful in the preferred gas generating composition may in general be any polymers that are either substantially water soluble or substantially water insoluble. It is required however, in order to prepare the composition, that a non-aqueous solvent be used which is compatible with the polymers used. Exemplary of useful water soluble polymeric substances are hydroxypropyl cellulose, hydroxyethyl cellulose, carboxymethyl cellulose, polyacrylamide, and polyvinyl alcohol. Useful water insoluble polymeric substances include cellulose acetate, cellulose acetate butyrate, ethyl cellulose, butyl cellulose, cellulose nitrate, polybutadiene, and polystyrene.

The solid reactants included in the gas generating composition comprise two or more reagents which when contacted with water produce the desired gas. When carbon dioxide is the desired gas, such reactants may include one or more organic acids, such as citric, malic, fumaric, tartaric, or maleic acid, or a corresponding anhydride; and one or more inorganic carbonates, such as a dibasic alkali metal carbonate, an alkali metal bicarbonate, or an alkaline earth carbonate.

The preferred gas generating composition may be prepared by suspending the solid gas-generating reactants in powdered form in a solution of the water soluble and water insoluble polymers. The suspension is then applied, such as by casting or dipping, to either an absorbent or non-absorbent material and the solvent evaporated. In the first case the absorbent material becomes impregnated with the composition or, if sufficiently high polymer concentrations are used or if thickening agents are added, a composite film-absorbent material pad is produced. Applying the suspension to a non-absorbent material such as glass, for example, a peelable film or block is produced.

It is contemplated that the gas generating composition disclosed herein will find use in areas other than microbiology. For instance a steady, controlled, humidity activated sulfur dioxide source may be provided by using an organic acid and an inorganic sulfite as the solid reactants in such a composition. Other applications will be readily apparent to those skilled in disciplines other than microbiology.

The present invention will now be illustrated, but is not intended to be limited, by the following examples.

EXAMPLE 1

This example relates to the preparation and use of nutrient pads of the type contemplated by the present invention in supporting the growth of *N. gonorrhoeae*.

A. A 100 ml. aqueous solution (solution A) was prepared containing the following ingredients:

| | |
|---|---|
| Proteus Peptone No. 3* | 6.0 gm |
| water soluble starch | 0.2 gm |
| dipotassium phosphate | 0.8 gm |
| monopotassium phosphate | 0.2 gm |
| sodium chloride | 1.0 gm |

*available from Difco Laboratories, Inc., Detroit, Mich. The solution was heated to boiling on a hot plate equipped with a magnetic stirrer and was steam sterilized in an autoclave at about 121°C. for 15 minutes. The sterilized solution was allowed to cool down to about 45°C., at which time 6.0 ml. of IsoVitaleX enrichment solution was added (IsoVitaleX is available from BBL, Division of Becton, Dickinson and Co., Cockeysville, Md).

B. A second solution (solution B) was prepared as follows: To 2 gm. of commercial hemoglobin was added 100 ml. of cold water. The resulting hemoglobin solution was heated to boiling on a hot plate equipped with a magnetic stirrer and then centifuged at 18,000 r.p.m. for 30 minutes. The supernatant was steam sterilized in an autoclave at about 121°C. for 15 minutes.

C. Solution A and solution B were combined and the following antibiotics added to form the indicated concentrations thereof in the combined solution:

| | |
|---|---|
| Vancomycin (Eli Lilly and Co., Indianapolis, Ind.) | 4 mg/ml |
| Sodium colistimethate (Warner-Lambert Co., Morris Plains, N.Y.) | 40 mg/ml |
| Amphotericin B (Grand Island Biologicals Co., Grand Island, N.Y.) | 5 mg/ml |
| Trimethoprim (Hoffman-LaRoche Inc., Rochester, N.Y.) | 5 mg/ml |

D. A section of S and S 470 filter paper, manufactured by Schleicher and Schuell, Inc., Keene, N.H., was impregnated with the solution prepared in step C above and then dried for 2 – 3 hours in a forced air oven at 35°C. The dry sheet was cut into 1 in. by 1 in. pads which were then mounted on organoplastic strips with double-back adhesive tape. These nutrient pads were sterilized with ethylene oxide and stored in desiccated containers.

E. In other to compare the nutrient pads prepared as above with conventional Thayer-Martin agar media for the selective culturing of *N. gonorrhoeae* the following experiment was carried out.

Conventional Thayer-Martin agar plates were prepared as described in *Public Health Reports* 82:361 (1967). The nutrient pads of the present invention were rehydrated by immersion in sterile distilled water for about 10 seconds. Corresponding nutrient pads and the conventional plates were similarly inoculated with the same ones of various *N. gonorrhoeae* strains by a swab/streaking technique and incubated 24 – 48 hours at 37°C. in a 5 – 15% carbon dioxide atmosphere. When treated with a conventional cytochrome oxidase indicator, the corresponding conventional plates and the nutrient pads showed positive and comparable growth.

EXAMPLE 2

This example relates to the preparation of carbon dioxide gas generating compositions for use in preparing culture means of the type contemplated by the present invention.

Acetone solutions containing cellulose acetate (acetyl content:39.4%, viscosity 45 centipoises, available from Eastman Kodak Co., Rochester, N.Y.) and hydroxypropyl cellulose (Klucel GF, available from Hercules, Inc., Wilmington, Del.) were prepared having concentrations of cellulose acetate and hydroxypropyl cellulose by weight as follows - 3:1%, 2:2%, and 1:3%. An acetone solution of 4% cellulose acetate and an acetone solution of 4% hydroxpropyl cellulose were also prepared. To each of the five acetone-polymer solutions was added sodium bicarbonate and citric acid to concentrations of 10 and 3% respectively. Each of the five solutions were then cast both on glass plates and on S and S 470 filter paper to a 50 mil wet thickness. The solutions were allowed to dry at ambient temperature. The solutions cast on glass plates produced films which could be peeled off, while the casting of the solutions on filter paper produced pads impregnated with the gas generating composition.

When the pads and films were immersed in water, gas bubbles were released. The evolution of gas from the films and pads comprising only water insoluble cellulose acetate was very slow, whereas the evolution of gas from the films and pads comprising only water soluble hydroxypropyl cellulose was very rapid. Those pads and fiflms comprising both cellulose acetate and hydroxypropyl cellulose produced gas at intermediate rates which varied in accordance with the amount of the water soluble hydroxyropyl cellulose therein.

EXAMPLE 3

This example relates to the use of nutrient pads and carbon dioxide generating pads or films of the type contemplated by the present invention in supporting the growth of *N. gonorrhoeae* without the use of external carbon dioxide generating apparatus.

A rectangular extent of each of the five carbon dioxide generating films and of each of the five carbon dioxide generating pads prepared from the five solutions in Example 2 was placed in the well 14 of a separate one of ten base members 10 of the type shown in FIGS. 1 and 2. A rectangular nutrient pad prepared as in Example 1 was placed in each of the respective wells 13 of said base members. The nutrient pads were rehydrated by adding about 0.6 ml. of sterile distilled water to each well 13. The nutrient pads were then respectively inoculated with various strains of *N. gonorrhoeae* using a swab/streaking technique, and conventional Thayer-Martin agar plates corresponding respectively to each of said nutrient pads were inoculated with the same microorganisms as the respective pads. A cover 17 as shown in FIG. 1 was engaged with each base member 1, and the assemblages thus produced were subjected to an incubating temperature of 37°C. for about 40 hours in a standard incubator having no carbon dioxide supply. The Thayer-Martin plates were subjected to an incubating temperature of 37°C for about 40 hours in an incubator equipped with carbon dioxide generating apparatus capable of producing a 5 – 15% carbon dioxide atmosphere in the incubation compartment.

After incubation, the agar plates and the nutrient pads were treated with a conventional cytochrome oxidase indicator. In those assemblages comprising carbon dioxide generating pads and films prepared from cellulose acetate/hydroxypropyl cellulose solutions in concentrations of 3:1%, 2:2%, and 1:3% the growth produced on the nutrient pads was comparable to that on the corresponding conventional agar plates. On the other hand, those devices of the present invention comprising carbon dioxide generating pads and films prepared from 4% cellulose acetate solutions and those prepared from 4% hydroxypropyl cellulose solutions yielded inferior growth in comparison to the conventional agar plates. The best growth was found in those assemblages comprising carbon dioxide pads and films prepared from 1:3% cellulose acetate/hydroxypropyl cellulose solutions.

EXAMPLE 4

This example relates to the preparation and use of indicator pads or films of the type contemplated by the present invention.

A. To a 15 ml. aqueous solution of 0.6 gm. polyvinyl alcohol (Elvanol No. 50–42, E. I. duPont De Nemours & Co., Inc., Wilmington, Del.) was added 5 ml. ethyl alcohol and 0.2 gm. dimethyl-p-phenylenediamine oxalate (a cytochrome oxidase indicator). The resulting indicator-polymer solution was dispensed in 3 ml. aliquots into shallow plastic dishes 3 cm. wide by 9 cm. long and allowed to dry in a forced air oven at 30°C. The resulting dry indicator films were peeled out of the dishes and cut into 1 cm. by 1.5 cm. sections which were then mounted on plastic strips with double-back adhesive tape for ease of handling. The indicator film strips were stored at room temperature in dark bottles.

B. To a 3% aqueous solution of polyvinyl alcohol was added N,N,N',N'-tetramethyl-p-phenylenediamine dihydrochloride (a cytochrome oxidase indicator) to a concentration of 1%. Sheets of S and S 470 filter paper were impregnated with this solution and dried in a forced air oven at 30°C. The resulting indicator impregnated sheets were cut into 1 cm. by 1.5 cm. sections and mounted on plastic strips with double-back adhesive tape. The indicator pad strips were stored at room temperature in dark bottles.

C. A pair of nutrient pads prepared according to Example 1 and a pair of conventional Thayer-Martin agar plates were inoculated with *N. gonorrhoeae* and incubated in a carbon dioxide environment to produce organism growth. The inoculated surface of one each of said pads and agar plates was contacted for about one minute with an indicator film, as prepared in procedure A above, the other of each being contacted with an indicator pad as prepared in procedure B above. Uniform positive results (the appearance of dark black spots) were observed in the case of both the nutrient pads and the agar plates. The results were also comparable to those observed when similarly inoculated and incubated nutrient pads and the conventional agar plates were contacted in the conventional manner with the appropriate cytochrome oxidase indicator in solution.

What is claimed is:

1. Means for culturing a microorganism in an environment enriched with a gas, comprising a microbiological nutrient means; a gas generating composition comprising at least two solid reactants which when contacted with water react to produce said gas and means for controlling the rate of reaction between said reactants, and thereby the rate of release of said gas; and means for enclosing said nutrient means and said gas generating composition.

2. Culturing means as in claim 1 wherein said means for controlling said reaction rate comprises, in combination, a water soluble polymeric substance and a water insoluble polymeric substance.

3. Culturing means as in claim 2 wherein said water soluble polymeric substance is hydroxypropyl cellulose, hydroxyethyl cellulose, carboxymethyl cellulsoe, polyacrylamide, or polyvinyl alcohol.

4. Culturing means as in claim 2 wherein said water insoluble polymeric substance is cellulose acetate, cellulose nitrate, cellulose acetate butyrate, ethyl cellulose, butyl cellulose, polybutadiene, or polystyrene.

5. Culturing means as in claim 1 wherein said nutrient means comprises a bibulous carrier member having a microbiological nutrient substance incorporated therewith.

6. Culturing means as in claim 1 additionally comprising a base member by which said nutrient means is carried.

7. Culturing means as in claim 6 wherein said gas generating composition is carried by said enclosing means.

8. Culturing means as in claim 6 wherein said nutrient means comprises a bibulous carrier member having a microbiological nutrient substance incorporated therewith.

9. Culturing means as in claim 8 wherein said gas generating composition is incorporated with a bibulous carrier member.

10. Culturing means as in claim 6 wherein said enclosing means is an envelope for enclosing said base member.

11. Culturing means as in claim 6 wherein said gas generating composition is also carried by said base member.

12. A test kit for the presumptive identification of a particular variety of microorganism comprising the culturing means of claim 11 and an indicator for said particular variety of microorganism, said indicator being incorporated with a bibulous carrier member, said bibulous carrier member being carried by said base member and being movable into contact with said nutrient means.

13. Culturing means as in claim 6 wherein said enclosing means comprises a cover member cooperable with said base member to form a closed chamber therewith.

14. Culturing means as in claim 13 wherein said gas generating composition is also carried by said base member.

15. Culturing means as in claim 14 wherein said base member is formed with at least two wells, said nutrient means being disposed in one of said wells and said gas generating composition being disposed in another of said wells, said wells being in gaseous communication when said base and cover members are engaged.

16. Culturing means as in claim 15 wherein said nutrient means comprises a bibulous carrier member having a microbiological nutrient substance incorporated therewith.

17. A test kit for the presumptive identification of *Neisseria gonorrhoeae* comprising the culturing means of claim 16 and a cytochrome oxidase indicator.

18. Culturing means as in claim 16 wherein said gas generating composition is in the form of a solid matrix.

19. Culturing means as in claim 16 wherein said gas generating composition is incorporated with a bibulous carrier member.

20. Culturing means as in claim 16 wherein said nutrient means is selective for a particular variety of microorganism.

21. Culturing means as in claim 13 wherein said gas generating composition is carried by said cover member.

22. Culturing means as in claim 1 wherein said solid reactants comprise at least two substances which when contacted with water produce carbon dioxide.

23. Culturing means as in claim 22 wherein said solid reactants comprise an organic acid and an inorganic carbonate.

24. Culturing means as in claim 1 for selectively culturing a particular variety of microorganism wherein said nutrient means is selective for said particular variety of microorganism.

25. A test kit for the presumptive identification of a particular variety of microorganism comprising the culturing means of claim 1 and an indicator for said particular variety of microorganism.

26. A test kit as in claim 25 wherein said nutrient means is selective for said particular variety of microorganism.

27. A test kit as in claim 25 wherein said indicator is incorporated with a bibulous carrier member.

28. A test kit as in claim 25 wherein said particular variety of microorganism is *Neisseria gonorrhoeae* and wherein said indicator is a cytochrome oxidase indicator.

29. A test kit as in claim 28 wherein said nutrient means is selective for *Neisseria gonorrhoeae*.

30. A test kit as in claim 28 wherein said cytochrome oxidase indicator is N,N,N',N'-tetramethyl-p-phenylenediamine dihydrochloride, p-aminodimethylaniline, dimethyl phenylenediamine, dimethyl-p-phenylenediamine oxalate, or a mixture of dimethyl phenylenediamine and alpha-naphthol.

31. Culturing means for selectively culturing *Neisseria gonorrhoeae* in an environment enriched with carbon dioxide, which device comprises a base member having bottom and sidewalls and formed with at least two wells; a bibulous carrier member disposed in one of said wells and having a nutrient medium selective for *Neisseria gonorrhoeae* incorporated therewith; a carbon dioxide generating composition disposed in another of said wells, said carbon dioxide generating composition comprising a water soluble polymeric substance, a water insoluble polymeric substance, and at least two solid reactants which in the presence of water react to produce carbon dioxide; and removable cover means engagable with said sidewall to form with said base member a closed chamber providing gaseous communication between said wells.

32. Culturing means as in claim 31 wherein said solid reactants comprise an organic acid and an inorganic carbonate.

33. Culturing means as in claim 31 wherein said water soluble polymeric substance is hydroxypropyl cellulose, hydroxyethyl cellulose, carboxymethyl cellulose, polyacrylamide, or polyvinyl alcohol.

34. Culturing means as in claim 31 wherein said water insoluble polymeric substance is cellulose acetate, cellulose nitrate, cellulose acteate butyrate, ethyl cellulose, butyl cellulose, polybutadiene, or polystyrene.

* * * * *